Figure 1:
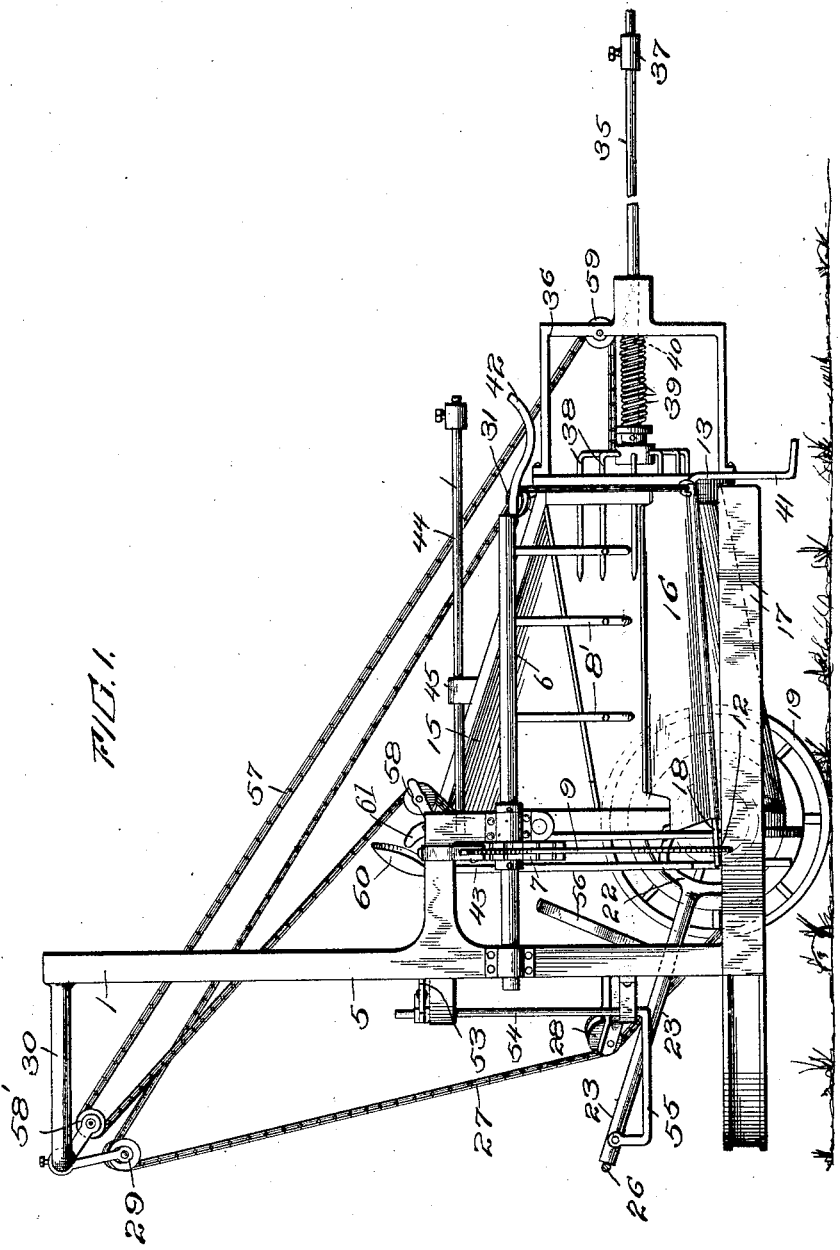

E. MOORE.
AUTOMATIC SHOCKER.
APPLICATION FILED MAR. 11, 1913.

1,121,527.

Patented Dec. 15, 1914.
4 SHEETS—SHEET 1.

Witnesses
R. S. Trogner.
W. H. Wakefield.

Inventor
Edwin Moore

By Mason Fenwick & Lawrence
Attorneys

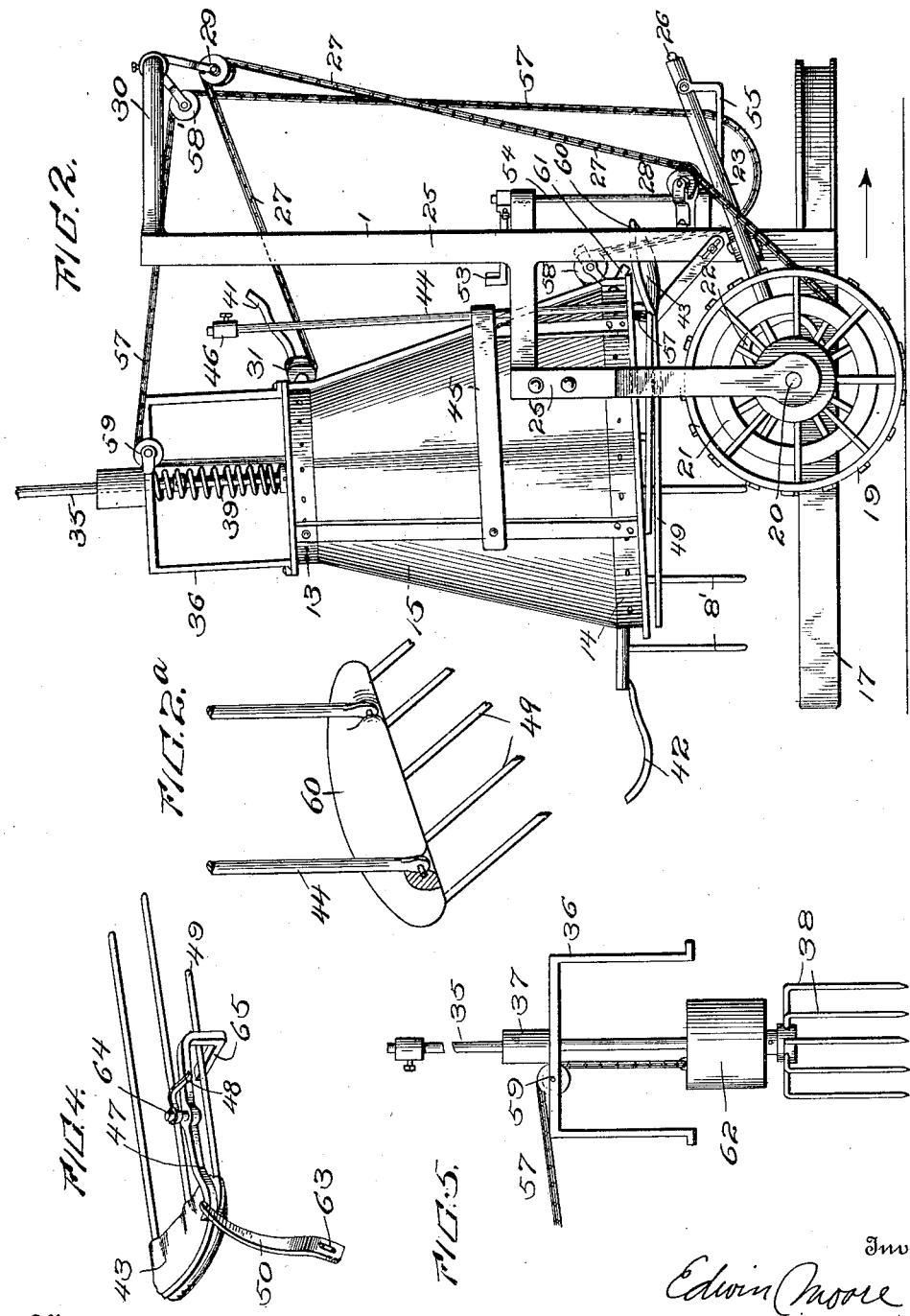

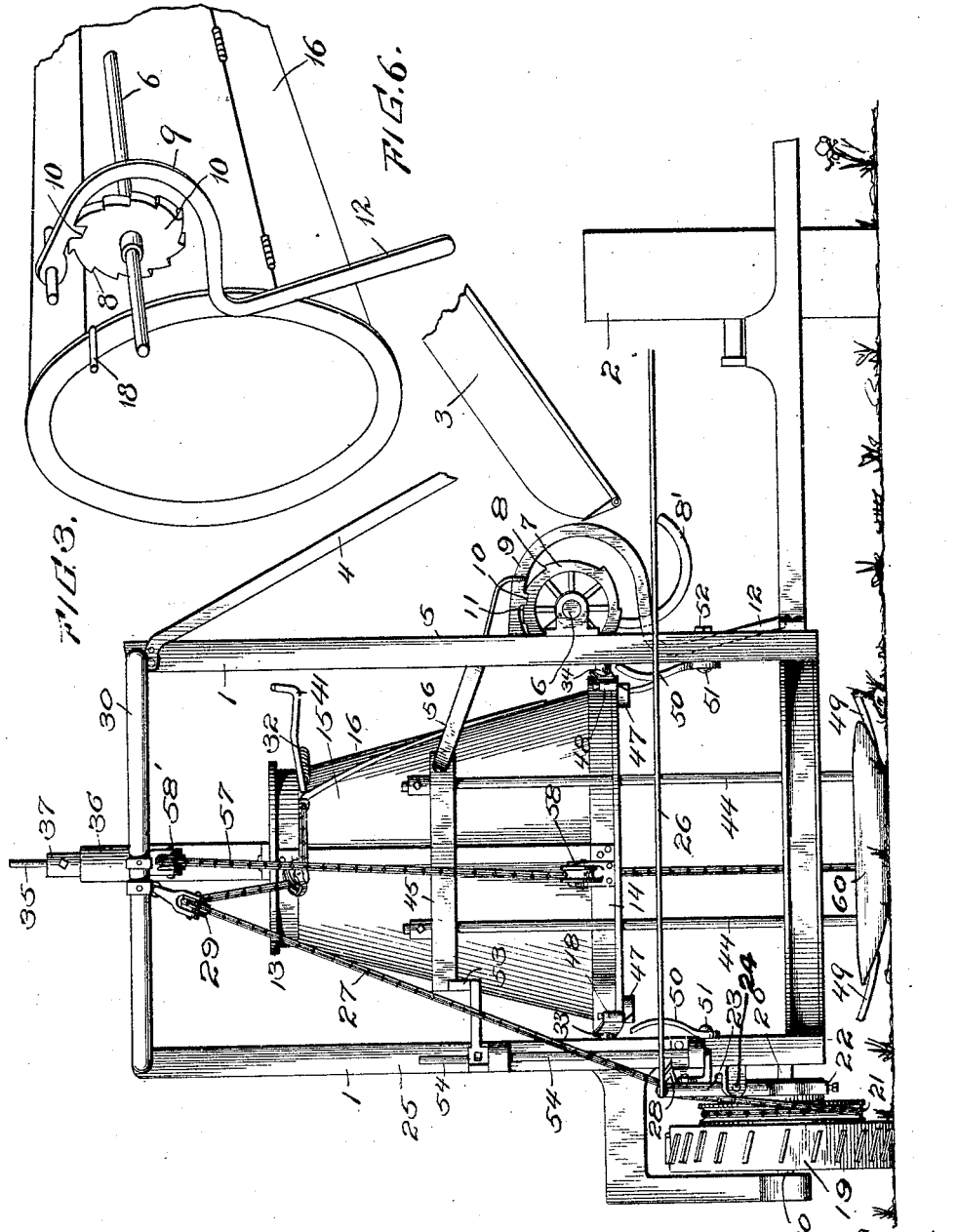

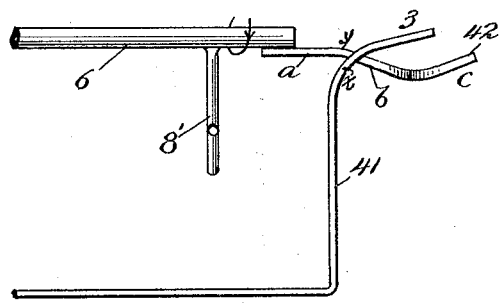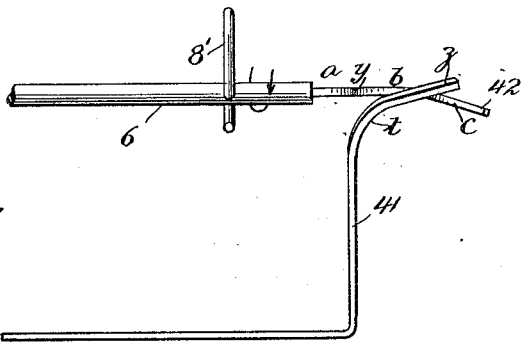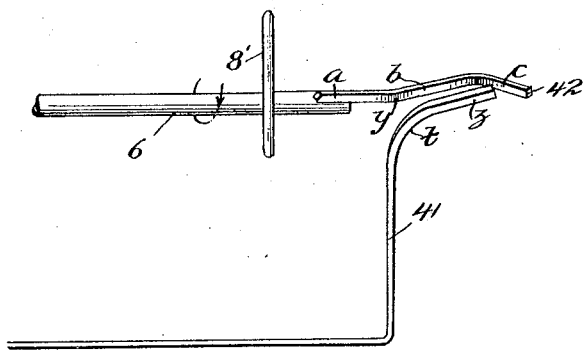

UNITED STATES PATENT OFFICE.

EDWIN MOORE, OF AUDREY, SASKATCHEWAN, CANADA.

AUTOMATIC SHOCKER.

1,121,527. Specification of Letters Patent. Patented Dec. 15, 1914.

Application filed March 11, 1913. Serial No. 753,583.

*To all whom it may concern:*

Be it known that I, EDWIN MOORE, a subject of the King of England, residing at Audrey, in the Province of Saskatchewan, Canada, have invented certain new and useful Improvements in Automatic Shockers; and I do hereby declare the following to be a full, clear, and exact description of the invention, such as will enable others skilled in the art to which it appertains to make and use the same.

This invention relates to automatic shock formers, and more particularly to that type of shock former which is normally horizontal and movable to a vertical position by means of mechanism carried by the shock former frame, and an object of the invention is to provide improved means for raising and lowering the shock former from a horizontal to a vertical position and back.

Another object of the invention is to provide a tilting shock former with a gate which serves to pass the bound sheaves from the binder to the shock former receptacle.

Another object of the invention is to provide tines so controlled by the swinging action of the shock receptacle that the tines will be positively driven to follow the sheaves to the ground and force the same in the stubble.

Another object of the invention is to provide a bottom for a shock former flexibly connected with the tines so that as the receptacle falls to its normal horizontal position, the tines will return the bottom to normal position.

A still further object of the invention is to provide means for preventing the misplacement of sheaves when the shock former is not in position to receive the sheaves, and to further provide means actuated by the door as the latter opens to permit the sheaves to be passed into the receptacle.

A still further object of the invention is to provide an adjustable trip for the purpose of stopping the rising action of the shock former at any predetermined position, and in further providing resilient means for starting the shock former on its return motion.

A still further object of the invention is to provide adjustable means carried by a frame on the shock former for automatically releasing the bottom of the former when the latter has reached a predetermined position.

A still further object of the invention is to provide a gate for a shock former which may be partly closed when the operator so desires, for the purpose of packing the sheaves within the former, the means for accomplishing this also making it necessary that the gate or door be completely closed before the shock former starts to rise.

With these and other objects in view, the invention consists in certain constructions, combinations and arrangements of the parts which will be hereinafter more fully described, and then specifically pointed out in the claims.

In the drawings, Figure 1 is a side elevation looking from the binder with the shock former in position to receive sheaves; Fig. 2 is a side elevation from the opposite side of the shock former showing the same in elevated position just before the bottom is released; Fig. 2ª is a perspective view of the bottom of the former, showing the manner of pivotally mounting the same; Fig. 3 is a front elevation of the shock former showing the relation of the parts just after the bottom has been released; Fig. 4 is a perspective view of the trip and trigger used for locking and unlocking the bottom of the shocker; Fig. 5 is a detail view of a modified means for returning the tines; Fig. 6 is a perspective view showing a portion of the conic former, and pawl and ratchet for controlling the passage of the sheaves in the former; and Figs. 7, 8 and 9 show diagrammatically the action of the cam rods used to return the device for restraining the sheaves to restraining position after the sheaves have passed into the former.

The description of the machine disclosed herein will be given at successive stages of the operation thereof, beginning with the normal horizontal position and proceeding throughout a complete operation.

Referring to the drawings, the frame 1 of the shock former is shown as connected to parts of a binder 2, this binder being of any approved design and provided with the usual delivery board 3, the binder with the delivery board forming no part of the present invention. By means of the brace 4, secured to the upper end of the frame 1, the entire frame is secured to the binder for the purpose of strengthening the same, the rod or brace 4 running, if desired, to the usual binder truck (not shown). Rotatably mounted upon the standard 5 of the frame 1, is a shaft 6 having thereon a ratchet wheel 7 provided with a plurality of teeth 8. Arms 8' are located just below the mouth of the delivery board 3, and are adapted to prevent the transference of sheaves from the delivery board 3 to the shock former when the latter is not in position to receive them. Pivotally mounted on the standard 5, is a pawl 9 having extending therefrom a tooth 10 adapted to engage a slot 11 formed in the ratchet wheel 7, the slot 11 having its sides substantially perpendicular to the periphery of the wheel 7 so that the said wheel 7 cannot be rotated in either direction when the tooth 10 is in the slot. The pawl 9 has extending beneath the ratchet wheel 7, an arm 12, the purpose of which will be described hereinafter.

The container for the shock former is composed of an upper ring 13 and a comparatively larger lower ring 14, between which extend suitable braces to which is secured a sheet of metal 15 formed substantially in the shape of a truncated cone and adapted to receive the sheaves and form the same in a shock previous to the delivery of said sheaves. Pivotally mounted in the upper and lower rings, is a door or gate 16, which gate 16 is designed to rest upon a side bar 17 forming part of the frame of the shock former, or this side bar 17 may be part of the binder. When the gate 16 is in the position shown in Fig. 1, it is designed to be placed beneath the arm 8', the gate in this position being adapted to pass the sheaves from the delivery board 3 to the shock former 15. Extending from one end of the gate 16, is a trip rod 18, which is adapted to engage the extending end 12 of the pawl 9 just as the shock former is being lowered from the raised position, this engagement of the extending end 12 by the trip rod 18, being sufficient to raise the tooth 10 from the slot 11, so that the arms 8' may be rotated by reason of the weight of the sheaves accumulated thereon, and thereby pass said sheaves over the gate 16 into the shock former. By referring to the ratchet wheel 7, it will be noted that the teeth thereon are so related to the tooth 10, as to permit the arms 8' to be rotated in one direction only, this direction being in the path of the moving sheaves.

After the requisite number of sheaves have been placed within the shock former, the same is elevated to the position shown substantially in Fig. 2, by means of the mechanism carried by the frame comprising a traction wheel 19 journaled within the frame 1 and having a shaft 20 upon which is slidably mounted a drum 21 and a clutch member 22, this clutch member being actuated by a lever 23 pivoted as at 24 in the side bar 25 of the frame 1. Pivotally connected to the lever 23, is a rod 26 passing across the front of the shock former and connecting with any suitable actuating means, not shown, this actuating means being within reach of the operator of the binder. When the lever 23 has moved the clutch 22 into engagement with the drum 21 the drum will wind up flexible chain, cord or other connection 27, this chain 27 being trained over a pulley 28 provided with suitable guards to prevent the slipping of the chain and also over a second pulley 29 depending from a cross bar 30 connecting the side bars 5 and 25. From the pulley 29, the chain 27 passes around a pulley 31 swiveled upon the upper ring 13 of the shock former, and connects to the upper outer end of the gate 16. Therefore, it will be seen that when the drum is drawn into engagement with the traction wheel by means of the clutch, the flexible connection 27 will draw upon the gate 16, and move the same in a direction to close the shock former 15. Mounted upon the upper ring 13 and connected to the outer upper end of the gate 16, is a spring 32 which opposes the closing of the gate, serves to hold the flexible member 27 taut, and also serves to open the gate 16 whenever the flexible member 27 is released, or becomes slack. After the gate 16 has been drawn tightly closed against the metal sheet former 15, and the drum continues to rotate, the chain 27 will begin to move the shock former to a vertical position, the lower ring 14 being provided with trunnions 33 and 34 journaled in side bars 25 and 5 respectively, to admit of this rotation.

As the shock former begins to move to its vertical position, a tine rod 35 will be constrained to move downwardly and to engage the tops of the sheaves. This tine rod 35 is slidably mounted within a bracket 36 and has an adjustable stop 37 mounted thereon for the purpose of limiting the downward movement thereof. Formed at the lower end of the tine rod 35, is a plurality of tines 38 which may be of any suitable number and size, and connected to the tine rod in any suitable way. Interposed between the tines 38 and the bracket 36, and loosely surrounding the tine rod 35, is a spring 39, this spring being a long compression spring so designed as to expand sufficiently to force the tines downwardly with the sheaves as the latter drop to the ground from the shock former. Within the spring 39, and rigidly connected to the tine rod 35, is a collar 40 made rigid with said rod, the collar 40 being so positioned upon the tine rod 35 as to engage the bracket 36 just before the spring 39 reaches its maximum compression, the object of this collar being to take the load of the lifting strain from the spring and transfer it to the bracket 36.

Rigidly connected to the upper outer end of the gate 16, is a bent trip rod 41, this trip rod 41 being adapted to engage a similar coöperating trip rod 42 rigidly secured to the outer end of the shaft 6. These bent trip rods are so related to each other that when the gate 16 is pulled upwardly by the flexible chain 27, the rod 41 will act upon the rod 42 to send the shaft 6 around to a position where the arms 8' will again be in the path of the moving sheaves. It will be understood that as the gate 16 assumes the position shown in Fig. 1, the trip rod 18 will act upon the extending end 12 of the pawl 9 and thus release the ratchet wheel 7, the ratchet wheel 7 remaining unlocked until the same has been rotated sufficiently by the turning of the bent rod 42 by the bent rod 41 for the slot 11 to move again under the tooth 10. After the tooth 10 has been removed from the slot to permit the accumulated sheaves held back by arms 8' to pass upon the gate 16, the ratchet wheel will be free to rotate in the direction of travel of the sheaves (clockwise looking at Fig. 3), and is prevented from returning by the teeth engaging the tooth 10. The arms 8', and hence wheel 7, turn because of the pressure of the accumulated sheaves when the pawl 12 is tripped, and the force of the descending sheaves is found sufficient to throw over the shaft and arms 8'. After being thrown over the arms 8' will fall to the position shown in Fig. 3 by gravity. Under normal conditions the sheaves passing over the gate 16, will force the arms 8' and the bent rod 42 around to such a position that the said rod 42 will be engaged by the bent rod 41 as the gate is raised by the flexible chain 27.

To insure that arms 8' will return as just stated and to avoid annoyance should the sheaves not force the arms 8' through a complete revolution, rods 41 and 42 are employed. In order better to understand the action of rod 41 upon rod 42, reference is to be had to Figs. 7, 8 and 9, where a series of views is shown illustrating successively the positions the rods assume when acting to return shaft 6 to normal position. It will be assumed that the sheaves have just passed the arms into the former and that, therefore, tooth 10 is out of slot 11 formed in wheel 7. In this position the arms 8' will be depending below shaft 6 and rod 42 will be substantially at the bottom of shaft 6. As the flexible connection 27 is drawn taut after the sheaves have passed into the former to close the door 16, the rod 41 carried by the door will rise and turn toward shaft 6 in a direction which is counter clockwise when looking from the left hand side of Fig. 7. The rod 42 is provided with a curve $y$ between straight portions $a$ and $b$, which curve $y$ is engaged by the curve $x$ of rod 41. Inasmuch as portion $b$ of rod 42 extends downwardly and away from the reader, it will be understood that as rod 41 continues to rotate toward shaft 6, the curve $x$ will slide along and raise portion $b$, but inasmuch as rod 42 is rigid with the shaft, this raising will be accompanied by a rotation of shaft 6 in a clockwise direction when looking from the left hand side of Fig. 7, as indicated by the arrow. The portion $b$ is acted upon by curve $x$ until the parts assume the position shown in Fig. 8, where the arms 8' are almost in position to be thrown to the other side of the shaft, and fall downwardly of their own weight. In order to give the slight further motion to shaft 6, which will shift the center of gravity of the arms 8' across the axis of shaft 6, the straightened portions $z$ extending from curve $x$ of rod 41 will engage the portion $c$ of rod 42 as rod 41 continues to rotate due to the closing of the door 16. Portion $c$ extends downwardly and away from the reader as viewed in Fig. 8, so that as portion $z$ slides along part $c$ the shaft 6 will be given a further slight rotation, which will be sufficient to shift the center of gravity of the arms 8' from the rear of shaft 6 to the front thereof, after which the shaft will rotate and arms 8' fall to their normal position. It is to be understood, of course, that ratchet wheel 7 prevents retrograde movement of shaft 6 before the arms 8' pass over the shaft 6, but that said ratchet wheel enables the arms to fall to normal position uninterruptedly. Fig. 9 shows the relation of the two rods just at the point when the center of gravity of the arms is shifted from one side of shaft 6 to the other.

When the shock former has assumed the position shown in Fig. 2, the sheaves are ready to be unloaded, and the whole weight of the sheaves comes upon the bottom 43 which is pivotally connected to guide rods 44 which pass through a brace 45 rigidly connected to the shock former 15. These guide rods 44 are provided with suitable adjustable stops 46 for limiting their downward movement, these stops being adapted to engage the support 45. Pivoted to the ring 14 on the under side thereof, are levers 47—47 each actuated by a suitable spring 48, which normally holds one end of the corresponding lever under the prongs 49 of the bottom.

Adapted to engage the outer end of the lever 47, is a trigger 50, which trigger is adjustably mounted upon the side bar 5, so that the same may be moved in either a vertical direction, or move about its pivot 51 as a center, the trigger being provided in its lower end with a slot permitting of a vertical movement around the pivot nut 52. This trigger 50 may be adjusted so as to engage the outer end of the lever 47 at any predetermined position of the shock former. Where the sheaves are long and the shock formed thereby is comparatively tall, it will be desirable to allow the shock former to pass slightly beyond the vertical position so that the rear end of the ring 14 will not engage the tops of the sheaves forming the shock to upset the same, whereas it is obvious that if the sheaves be short, the same may be delivered as soon as the shock former assumes a vertical position. When the lever 47 is tripped by the trigger 50, the bottom 43 will be free to descend and will fall completely to the ground and carry the formed shock therewith. Inasmuch as the shock former is moving continuously in the direction of the arrow as shown in Fig. 2, and inasmuch as the protruding stubble of the grain will catch the lower ends of the sheaves, the shock will be held on the ground at the place where it falls and the bottom will move outwardly from thereunder with the shock former. At the moment of delivery, it is desirable to have the drum 21 disconnected from the traction wheel, and this is accomplished by means of a trip 53 adjustably mounted upon a trip rod 54, which trip rod 54 has an extending end 55 which is pivotally connected to the lever 23. The trip 53 is designed to be in the path of the brace 45, which brace 45 is adapted to engage the trip after the shock reaches the ground, so that the drum 21 will coöperate with the flexible chain 27 to rotate the shock former through a small angle after the bottom has dropped, this rotation being sufficient to allow the shock to fall and the bottom to pass from thereunder. When the brace 45 engages the trip 53, the end 55 will move the lever 23 in a direction to disengage the clutch 22 from the drum 21 and traction wheel. When this takes place, the tension will be released in the chain 27, and the shock former will be left standing practically in a vertical position with respect to the frame 1. In order to insure a quick return, there is provided a resilient means such as a spring 56 secured to the side bar 5 and engaging the brace 45. As the shock former nears the end of its travel, the brace 45 will engage the spring 56 and distort the same sufficiently so that when the chain 27 is slacked, the said spring 56 will start the shock former on its return.

When the shock former starts on its return movement, the bottom 43 is in its lower position, and in order to raise the same to the position shown in Fig. 2, there is provided a flexible chain 57, which passes over a pulley 58 mounted on the lower ring 14, and is secured to one side of the pivot point of the bottom 43. This flexible member 57 is drawn over a pulley 58' mounted in the cross bar 30, and from there is led over a second pulley 59, mounted upon the bracket 36. From the pulley 59, the chain 57 passes downwardly parallel to the tine rod 35, and is secured to one of the tines 38. As the shock former descends, the first operation is to tighten the chain 57 which results in a compression of the spring 39. Before the shock former reaches its lowermost position as shown in Fig. 1, the spring is compressed until the rigid collar 40 engages the bracket 36, which prevents all further movement of that end of the flexible chain 57 which is connected to the tines 38. A further descent of the shock former will cause the flexible chain 57 to draw upwardly upon the bottom 43, inasmuch as both the tine rod and the pulley 58 are moving away from the pulley 58'. When the bottom 43 has almost reached its normal position with respect to the lower ring 14, the projecting end 60 of the bottom engages a lug 61 rigid with the ring 14, the lug 61 being upon the opposite side of the pivot point of the bottom from the point where the chain 57 connects to the bottom. By reason of this lug 61, a further descent of the shock former will force the bottom up to a position shown in Fig. 2, until the levers 47 engage the prongs of the bottom. When the bottom is located as just described, and the collar 40 engages the bracket 36, the chain 57 will be rigid and will support the shock former 15 in its lower position. As the shock former assumes the position just described, the pin or trip rod 18 will trip the pawl 9 to permit the accumulated sheaves held by the arms 8', to be passed over the gate 16 into the shock former 15. This returns the shock-forming receptacle to its normal horizontal position with the door 16 open, and the shocker is again in a position to go through the operation just described.

Fig. 4 of the drawings shows in detail the mechanism for tripping the bottom of the shocker. The trip or trigger 50 is provided with a longitudinal slot 63 within which works the bolt or other pivot member 51, this slot 63 making it possible to rotate the trigger 50 about the pivot 51, and also admit of some radial adjustment. The lever or dog 47 is pivoted to the bottom ring 14 by means of a pin 64, one end of the dog being adapted to engage the trigger 50, whereas the other end is bent downwardly and inwardly as at 65, to provide means for engaging one of the prongs 49 of the bottom 43. As the bottom turns in a vertical plane, the body portion of the trigger 50 will swing the dog 47 so that the inwardly bent portion 65 will release the prongs 49. One of these devices is arranged upon either side of the shock former as indicated in Fig. 3.

In Fig. 5 is shown a modified means for actuating the tines and tine rod. Instead of the spring 39, there is provided a weight 62 which is rigid with the tine rod 35, the weight 62 being connected to the chain or other flexible connection 57. This weight is so placed upon the tine rod 35, that its upper surface engages the bracket 36 to limit the upward movement of the tine rod 35 in a way similar to the action of the collar 40. When the shock former is turned to vertical position, the weight 62 will be sufficient to force the tines into the tops of the sheaves and in this capacity act the same as the spring 39. If the collar 40 be not used in the preferred form, it will be seen of course that the spring 39 will be compressed to its minimum length when the adjacent coils will touch each other, in which event the supporting strain transferred by the chain 57, will be taken up by the spring 39. Whichever form be used, however, it is desirable to have the driving means for forcing the tines downwardly and the limiting means for determining the upward movement of the tine rod 35, made substantially in one piece.

In the rising of the shock former, it is desirable that the brace 45 engage the spring 56 before engaging the trip 53, and after the brace 45 has engaged the trip 53, it is desirable to have the trigger 50 engage the dog 47 for releasing the bottom. The reason for this is that it is desirable to store sufficient energy in the spring 56 before the clutch mechanism is thrown out of gear with the traction wheel to return the shock former past the center, and further it is desirable during the instant that the formed shock is falling, to have the shock former in stationary position, hence the necessity for disengaging the drum 21 from the traction wheel.

Having thus described the invention, what is claimed as new is:

1. A shock former comprising a frame, a shock receptacle normally horizontal and pivotally mounted on the frame, a tine rod slidably mounted upon the shock receptacle and extending thereabove, a movable bottom for the shock receptacle, a flexible member connecting the bottom and tine rod, a pulley carried by the frame above the former over which the flexible member passes, the end of the flexible member connected to the bottom being held against movement while the end connected to the tine rod is adapted to raise the same as the shock receptacle moves to horizontal position.

2. A shock former comprising a frame, a shock receptacle normally horizontal and pivotally mounted on the frame, a tine rod slidably mounted on the shock receptacle, and extending thereabove substantially in a line with the axis of the shock receptacle, a spring surrounding the tine rod and loosely mounted thereon, a movable bottom for the shock receptacle and means connected to the movable bottom and tine rod adapted to hold the bottom against the shock receptacle to hold the tine rod in raised position when the shock receptacle is in horizontal position.

3. In a shock former, a frame, a shock receptacle normally horizontal pivotally mounted on the frame, a tine rod slidably mounted on the receptacle, and pointing inwardly with respect to the receptacle, a driving and stopping means carried by the tine rod, said means being adapted to drive the tine rod inwardly as the receptacle moves upwardly from the horizontal and adapted to limit the outward motion of the tine rod as the receptacle returns to the horizontal.

4. In a shock former, a frame, a shock receptacle normally horizontal, pivotally mounted on the frame, a tine rod slidably mounted on the receptacle, and pointing inwardly with respect to the receptacle, means for driving the rod downwardly as the receptacle swings from the horizontal, a movable bottom for the receptacle, and a flexible connection between the bottom and tine rod adapted to raise the tine rod as the receptacle assumes its horizontal position.

5. In a shock former, a frame, a shock receptacle normally horizontal and pivotally mounted on the frame, a tine rod slidably mounted in the receptacle, and pointing inwardly with respect to the receptacle, a spring loosely mounted on the tine rod, a collar rigid with the tine rod and located within the spring, said collar engaging the receptacle to prevent complete compression of the spring as the tine rod slides on the receptacle, and flexible means engaging the tine rod and frame for supporting the receptacle in a horizontal position.

6. In a shock former, a frame, a shock receptacle normally horizontal, and pivotally mounted on the frame, a tine rod mounted on the receptacle, and pointing inwardly with respect to the receptacle, a spring loosely surrounding the tine rod, a collar rigid with the tine rod and engaging the receptacle, a movable bottom for the receptacle, and a flexible connection between the tine rod and bottom, said flexible connection supporting the receptacle in horizontal position.

7. In a shock former, a frame, a shock receptacle normally horizontal and pivotally mounted on the frame, a bracket secured to the receptacle, and pointing inwardly with respect to the receptacle, a tine rod slidably mounted in the bracket, a spring loosely surrounding the rod, a collar rigid with the rod and engaging the bracket before the spring is completely compressed, a pulley mounted on the bracket, and a flexible connection passing around the pulley and engaging the frame and tine rod to support the receptacle in normal position.

8. In a shock former, a frame, a shock receptacle pivotally mounted in the frame and normally horizontal, a bracket secured to the receptacle, and pointing inwardly with respect to the receptacle, a tine rod slidably mounted in the bracket, a pivotally mounted bottom for the receptacle, a flexible connection between the tine rod and a point on one side of the pivot of the bottom, the flexible connection being adapted to raise the bottom as the receptacle moves to horizontal position, and a lug rigid with the receptacle and adapted to engage the bottom at a point on the other side of the pivot of the bottom.

9. In a shock former, a frame, a shock receptacle pivotally mounted on the frame and normally horizontal, a bracket secured to the receptacle, and pointing inwardly with respect to the receptacle, a tine rod slidably mounted in the bracket, a collar rigid with the said rod, a movable bottom for the receptacle pivotally mounted thereto, a lug rigid with the receptacle and adapted to engage the bottom on one side of the pivot, and a flexible connection engaging the tine rod and the bottom on the other side of the pivot.

10. In a shock former, a frame, a shock receptacle, pivotally mounted thereon, a tine rod slidably mounted on the receptacle, and pointing inwardly with respect to the receptacle, a bottom pivotally mounted on the receptacle, a lug rigid with the receptacle and adapted to engage the bottom, and a flexible connection between the tine rod and bottom adapted to raise the tine rod and bottom as the receptacle turns.

11. In a shock former, a frame, a shock receptacle pivotally mounted on the frame, a tine rod slidably mounted upon the receptacle, and pointing inwardly with respect to the receptacle, a collar rigid with the tine rod and adapted to limit the upward movement thereof, a bottom for the receptacle pivotally mounted thereon, a lug rigid with the receptacle and adapted to engage the bottom as the latter rises, and a flexible connection between the tine rod and bottom and engaging the frame, said connection adapted to raise the rod and bottom as the receptacle swings to its horizontal.

12. In a shock former, a frame, a shock receptacle pivotally mounted on the frame, means for rotating said receptacle, a resilient member adapted to engage the receptacle as the latter nears one limit of its movement, and a trip actuated by the receptacle and adapted to release the rotating means, the resilient member serving to start the receptacle on its return movement.

13. In a shock former, a frame, a shock receptacle pivotally mounted on the frame, a ratchet wheel rotatably mounted on the frame, means connected to the ratchet for holding sheaves, a pawl engaging the ratchet and holding the sheaf holding means in a fixed position, and means secured to the receptacle adapted to trip the pawl to release the sheaf holding means.

14. In a shock former, a frame, a shock receptacle pivotally mounted on the frame, sheaf-engaging arms rotatably mounted on the frame, a closure for the receptacle pivoted thereto, means for holding the arms rigid when the closure is closed, and means engaged by the closure for releasing the arms as the closure opens.

15. In a shock former, a frame, a shock receptacle pivotally mounted on the frame, a closure for the receptacle pivotally mounted thereon, means for holding the sheaves while the closure is closed, and means engaged by the closure for releasing the sheaf-holding means as the closure opens, the said sheaf-releasing means being adjacent and above the closure when the latter is in open position.

16. In a shock former, a frame, a shock receptacle pivotally mounted thereon, a closure for the receptacle pivotally mounted thereon, means for opening the closure, means for holding the sheaves while the closure is closed, and means engaged by the closure for releasing the sheaf-holding means as the closure opens, the said sheaf-releasing means being adjacent and above the closure when the latter is in open position.

17. In a shock former, a frame, a shock receptacle pivotally mounted on the frame, a pivotally mounted bottom for the receptacle movable with respect to the receptacle, means for guiding the bottom, a spring actuated dog pivotally mounted on the receptacle and adapted to engage the bottom to lock the same when the latter is raised upwardly, and a lug rigid with the receptacle and adapted to engage the bottom on the upward travel of the same and lock the bottom on the dog.

18. In a shock former, a frame, a shock receptacle pivotally mounted on the frame, a bottom for the receptacle movable with respect to the receptacle, means for guiding the bottom, a spring-actuated dog pivotally mounted on the receptacle, means carried by the bottom adapted to engage the dog as the bottom moves upwardly to lock the bottom, and means for raising the bottom.

19. In a shock former, a frame, a shock receptacle, pivotally mounted on the frame, a plurality of guide rods slidably mounted in the receptacle, a bottom for the receptacle mounted on the rods, means for raising the bottom, and means secured to the receptacle and engaging the bottom to maintain the same in elevated position.

20. In a shock former, a frame, a shock receptacle pivotally mounted on the frame, a plurality of guide rods slidably mounted in the receptacle, a bottom provided with tines mounted on the rods, a spring-actuated dog pivoted to the receptacle and adapted to engage one of the tines as the bottom is raised, and means for raising the bottom.

21. In a shock former, a frame, a shock receptacle pivotally mounted on the frame, a plurality of guide rods slidably mounted on the receptacle, a bottom pivotally connected to the rods, a spring-actuated dog pivotally mounted upon the receptacle, tines forming part of the bottom, one of which is adapted to engage the dog, a lug rigid with the receptacle and adapted to engage the bottom to force the said tines against the dog as the bottom is raised, and means for raising the bottom.

In testimony whereof I affix my signature in presence of two witnesses.

EDWIN MOORE.

Witnesses:
CHAS. WELCHMAN,
DELBERT WRUTH.

Copies of this patent may be obtained for five cents each, by addressing the "Commissioner of Patents, Washington, D. C."